Sept. 13, 1966 J. L. TIERNEY ET AL 3,272,376
INSECT CONTAINER
Filed Nov. 15, 1963

INVENTORS
JOHN L. TIERNEY &
ANDREA L. TIERNEY
BY
Gardner & Zimmerman
ATTORNEYS

United States Patent Office 3,272,376
Patented Sept. 13, 1966

3,272,376
INSECT CONTAINER
John L. Tierney and Andrea L. Tierney, both of
1021 El Camino Ave., Stockton 7, Calif.
Filed Nov. 15, 1963, Ser. No. 324,094
2 Claims. (Cl. 220—19)

The present invention relates generally to devices for confining insects and similar creatures, and more particularly is directed to a device suitable for use by children to collect and observe various live small creatures as a form of nature study.

It is well known that children of all ages, including very young ones, enjoy catching, collecting and observing live insects, worms and similar creatures. Often these children use a tin can or cardboard box in which to enclose and save the insects after they are caught. These containers, although readily available around a household, are disadvantageous in that it is difficult for one to observe the insect while thus enclosed. Also, it is necessary to punch holes in a make shift lid for a tin can, or similarly to ventilate a cardboard box in order that air for breathing is provided to the enclosed insect or other creature. With the foregoing enclosures the lid must be removed in order to get a view of the insect, and in the case of insects that can fly, such as butterflies and the like, it is completely impractical to open the container's lid. Consequently, children often will use a glass jar or the like having a metal screw on lid. While a glass jar provides good visibility of the enclosed insect, it can be highly dangerous because of the possibility of being dropped and shattered into jagged pieces of broken glass. This danger is particularly notable in the case of small children, whose small hands may find it difficult to grasp a slick glass jar, particularly if made slippery by moisture. In addition, when a glass jar is used it is still necessary to puncture holes in the jar's lid to provide ventilation, and the sharp points of a punctured metal lid also can be dangerous for small children.

Accordingly, it is an object of the present invention to provide a container for enclosing various live small creatures which affords ready ventilation for the creatures, enables easy unobstructed observation of the creatures, and which is completely safe to use by small children in that no sharp dangerous protuberances are present and the device is virtually unbreakable.

Another object of the invention is to provide a container of the type disclosed that can be readily and easily grasped and manipulated by a small child, and which can be handled with little chance of being dropped. Further in this regard, the instant container is highly attractive to children in that it can be handled by them with no fear of the insect enclosed in the container.

A further object of the present invention is to provide a device of the type described that is inexpensive and easy to manufacture, and which provides a low cost substitute for prior dangerous and impractical containers such as glass jars, cardboard boxes and tin cans.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 3:
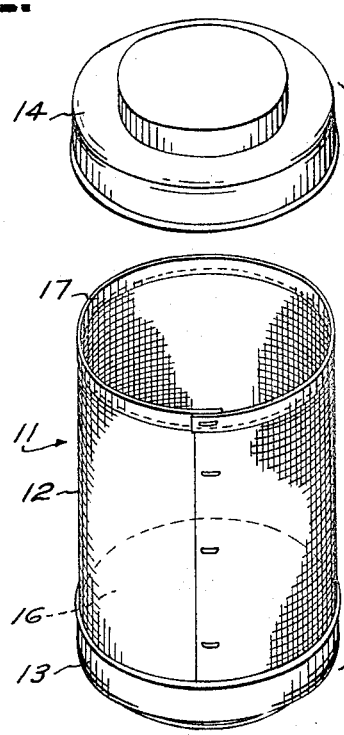
FIGURE 3 is an exploded perspective view of the device shown in FIGURE 1 with the lid opened.

A preferred embodiment of the present embodiment shown in the drawing comprises a container 11 including a generally tubular cylindrical screen 12 closed at its lower end by an imperforate bottom member 13, and at its upper end by a lid 14. In general, the lid 14 can be opened as shown in FIGURE 3 to enable various insects or the like to be placed within the container 11 for confinement therein.

Figures 1, 2:
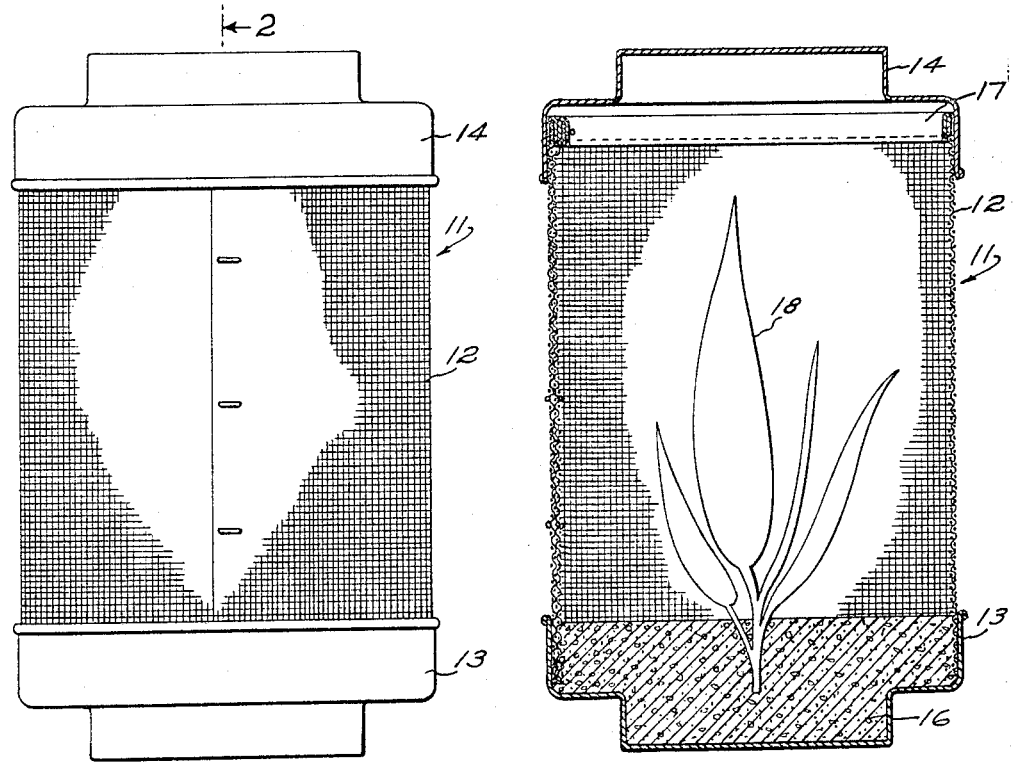
FIGURE 1 is a side elevational view of a preferred embodiment of the invention.
FIGURE 2 is a cross sectional elevation view taken along the plane of line 2—2 shown in FIGURE 1.

One of the important structural features of the present invention relates to the provision of a heavy mass of casting plaster or similar material to form a weighted portion 16 in the bottom member 13. In constructing the container, the plaster first is poured into the bottom member 13, after which the screen 12 is imbedded into the plaster as best shown in FIGURE 2, whereby the screen, weighted portion, and bottom form an integral unit when the plaster dries. The foregoing construction provides an inexpensive and quick means for securing the screen to the bottom member, while the weighted portion 16 serves to provide equilibrium and stability to the container. In particular, the container can be tilted at extreme angles, and still return to an upright position as a result of the weighted portion.

The screen 12 is made of a fine mesh flexible metal construction, but having sufficient resiliency to maintain its generally tubular configuration. The tubular shape of the screen is most readily provided by bending a rectangular sheet of flexible screen material into cylindrical form, and securing the adjacent edges of the sheet along a generally vertical seam. The screen preferably is formed into its tubular or cylindrical shape prior to being imbedded in the weighted lower portion 16.

With regard to the lid 14 and the manner of removably securing it to the upper end of the screen 12, it is noted that a folded strip of material 17 is secured along the upper edge of the screen. The strip 17 is formed of a flexible felt or cloth material, and functions as a part of the present invention in two respects. By being disposed over the upper screen edge and folded downwardly on both sides thereof, the strip 17 serves protectively to cover the sharp exposed edges of the screen that normally are present when fine mesh screen material is cut or trimmed. In addition, since the strip 17 is flexible it can flex or bend with the flexible screen material to which it is secured. Consequently, the lid 14 is dimensioned for a light frictional fit relationship with the upper screen edge and strip 17, whereby the lid can be resiliently engaged with the strip and screen to be retained in a secure closed position yet enabling the lid to be removed in a ready manner when required. In place of the aforesaid felt or cloth material, the strip 17 may also be made of a plastic material having suitable friction properties for resiliently engaging the lid 14.

In using the container 11, the lid 14 can be removed so that insects or the like may be placed within the screen 12, after which the lid can easily be replaced in closed position over the strip 17 to confine the insects within the container. The insects so confined are readily observable through the screen 12, the latter also providing free ventilation to the interior of the container. Consequently, insects can be saved or collected for observation for any period of time.

By utilizing a fine mesh flexible screen 12, the container is very easy to grasp by a child, since the screen yields or bends somewhat under a child's grip, and thus the container is not suceptible to being dropped as might be a glass jar such as is often used for similar purposes by children. By having an imperforate bottom member 13, children are less likely to be frightened by the insects within the container, since if desired the container can be grasped by its bottom thus placing the hand out of proximity to the perforated screen 12. Furthermore, the weighted portion 16 provides a certain amount of heft to the container, whereby it can be positively grasped and held by a child and not easily knocked out of his hands. In addition, the weighted portion lends stability to the container when it is placed on a table or the like, so that if it is tilted over it will return to its vertical normal position. This latter feature in addition to providing easy handling for a child, also can be a source of amusement to him by intentionally tilting the container. Preferably an object such as a leaf sprig 18 formed of plastic material or the like is mounted within the container. The sprig as here shown has its lower end embedded in the plaster portion 16. The purpose of the sprig, aside from adding to the visual appeal of the toy, is to allow the contained insect to climb up off the "floor" of the toy, and thereby allow a more interesting observation of the insect for the viewing child.

From the foregoing it is apparent that the present invention provides a highly useful educational toy for children, that is safe and easy to use, and which encourages nature study.

What is claimed is:

1. A device of the character described comprising, a cup-shaped imperforate bottom member, a solid weighted portion rigidly secured in said cup-shaped member, a tubular member having its lower portion permanently embedded in said weighted portion with said cup-shaped member disposed in closing relation to the lower end of said tubular member, said tubular member being formed of a fine mesh flexible screen material, and a cup-shaped lid member releasably secured in closing relation to the remaining end of said tubular member.

2. A device as described in claim 1 further defined by a strip of flexible material disposed along the upper edge of said tubular member in overlying relation therewith and permanently secured thereto, said cup-shaped lid being frictionally and resiliently engageable with said strip.

References Cited by the Examiner

UNITED STATES PATENTS

| | | | |
|---|---|---|---|
| 259,743 | 6/1882 | Boyd | 220—68 |
| 855,080 | 5/1907 | Westerbeck. | |
| 2,756,912 | 7/1956 | Armstrong | 43—55 X |

THERON E. CONDON, *Primary Examiner.*

G. E. LOWRANCE, *Assistant Examiner.*